United States Patent [19]

Ohmori et al.

[11] Patent Number: 4,630,189

[45] Date of Patent: Dec. 16, 1986

[54] SYSTEM FOR DETERMINING ABNORMAL PLANT OPERATION BASED ON WHITENESS INDEXES

[75] Inventors: Kazunori Ohmori, Fuchu; Kensuke Kawai, Higashi-Murayama, both of Japan

[73] Assignee: Kabushiki Kaisha Toshiba, Kawasaki, Japan

[21] Appl. No.: 618,713

[22] Filed: Jun. 8, 1984

[30] Foreign Application Priority Data

Jun. 10, 1983 [JP] Japan ................................ 58-102736

[51] Int. Cl.$^4$ ............................................. G05B 13/04
[52] U.S. Cl. .................................. 364/150; 364/158; 364/162; 364/185
[58] Field of Search ............... 364/149, 150, 151, 158, 364/159, 162, 572, 185; 318/561

[56] References Cited

U.S. PATENT DOCUMENTS

| | | | |
|---|---|---|---|
| 3,798,426 | 3/1974 | Bristol, II | 364/158 |
| 4,027,145 | 5/1977 | McDonald et al. | 364/151 |
| 4,214,301 | 7/1980 | Kurihara et al. | 364/150 |
| 4,349,869 | 9/1982 | Prett et al. | 364/149 |
| 4,451,878 | 5/1984 | Shigemasa et al. | 364/151 |
| 4,466,054 | 8/1984 | Shigemasa et al. | 364/162 |

FOREIGN PATENT DOCUMENTS

| | | |
|---|---|---|
| 1021481 | 3/1966 | United Kingdom . |
| 1149062 | 4/1969 | United Kingdom . |
| 1476937 | 6/1977 | United Kingdom . |
| 1476938 | 6/1977 | United Kingdom . |
| 1476939 | 6/1977 | United Kingdom . |

OTHER PUBLICATIONS

"Control System Synthesis," J. G. Truxal, pp. 437-438, 443-444, 1955, McGraw-Hill.
"Digital Control Systems", R. Isenmann, pp. 242-244, 361-366, 397-399, 1977, Springer-Verlag, Berlin, Heidelberg, New York.
"Adaptive Control Systems", Mishkin and Braun, pp. 303-306, 1961, McGraw-Hill.

Primary Examiner—Jerry Smith
Assistant Examiner—John R. Lastova
Attorney, Agent, or Firm—Schwartz, Jeffery, Schwaab, Mack, Blumenthal & Evans

[57] ABSTRACT

In a method and a system for diagnosing a thermal power plant system including a thermal power plant, provided with an automatic power plant control system performing PID control, and a direct digital control system utilizing a control model representing the combination of the plant and the automatic power plant control system and controlling the plant to conduct an optimum control, the automatic power plant control system and the direct digital control system conducting control complementarily: a plant diagnostic model formed of a mathematical model representing the combination of the plant, the automatic power plant control system, the control model and the direct digital control system, is provided and used to determine predicted values of the plant variables; difference between the predicted value of each of the plant variables and the actual value of the same plant variable is determined, and stored thereby to provide a time series of the differences which have been successively determined; whiteness indexes used for testing the whiteness level of the time series of the differences are determined in accordance with the time series of the differences; judgement is made as to whether or not any of the plant variables is abnormal in accordance with the whiteness indexes; judgement is made as to whether or not any of the manipulated variables is faulty in accordance with the whiteness indexes and the result of judgement as to abnormality; and an alarm is outputted when an abnormality or a fault is detected.

16 Claims, 14 Drawing Figures

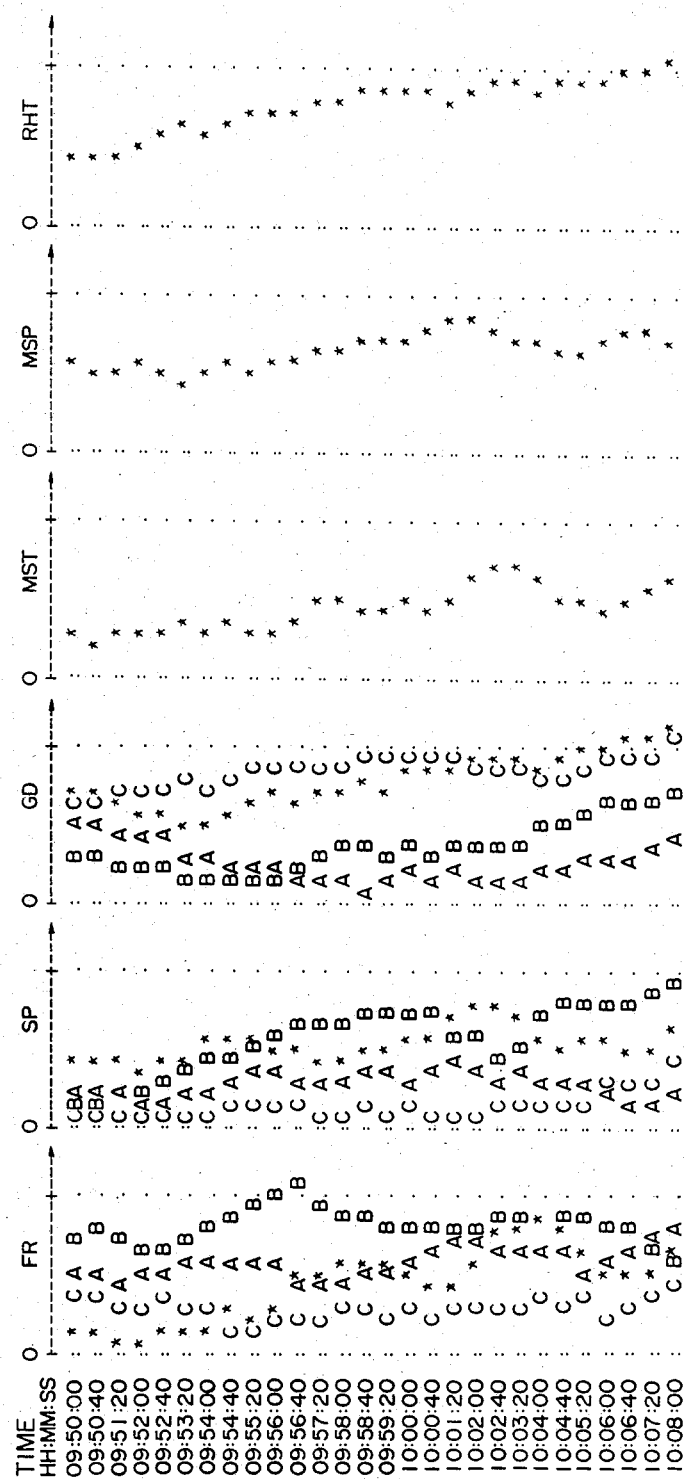

SYSTEM FOR DETERMINING ABNORMAL PLANT OPERATION BASED ON WHITENESS INDEXES

BACKGROUND OF THE INVENTION

The present invention relates to a method and a system for diagnosing a thermal power plant system.

In process control of a thermal power plant, automatic power plant control systems (hereinafter referred to as APC systems) of an analog type which perform conventional PID control using feedback signals of the process state variables have been used. An example of APC system is shown in FIG. 1, which comprises a PID arithmetic operation unit 21 in the form of control algorithm performing proportional (P) action plus integral (I) action plus differential (D) action. State variables FB are fed back from a thermal power plant 1, and deviation DEV of each of the state variables FB from the corresponding target value or set value SV is determined by an adder 22. The deviation DEV is fed to the PID arithmetic operation unit 21, which produces a manipulated variable ACT.

In FIG. 1, only a single control loop is illustrated, but APC systems for a large-sized thermal power plant of today have several tenths of control loops and they frequently interfere with each other.

As an example, a general arrangement of a thermal power plant and an APC system therefor are shown in FIGS. 2A and 2B. As shown in FIG. 2A, fuel is injected by means of a fuel injection pump FIP into a burner of a boiler, while air is supplied by means of an air fan into the burner so that combustion occurs. Water is fed by means of a boiler feed pump BFP into the boiler and made to rise along the walls of the boiler to become steam and superheated by a superheater SH. Water is sprayed by a spray device SP on the steam to control the temperature of the superheated steam. The superheated steam is passed through a high pressure turbine HP. The steam that has been passed through the high pressure turbine HP is returned to the boiler and is reheated by a reheater RH and is then passed through middle and low pressure turbines LP to drive them. The turbines HP and LP are connected to an electric generator G. The steam is thereafter condensed in a condenser COND to become water, which is then fed to the boiler feed pump BFP. A gas damper GD is used to adjust the flow rate of a high temperature gas through the reheater RH and thereby control the temperature of the reheated steam.

The fuel injection pump FIP operates in compliance with a fuel injection rate command value $FIR_c$ given as a manipulated variable from the APC system (FIG. 2B), while the actual fuel injection rate $FIR_f$ is detected and fed back as a state variable to the APC system. Similarly, the air injection rate is adjusted by means not shown in compliance with an air injection rate command value $AIR_c$ given as a manipulated variable from the APC system, while the actual air injection rate $AIR_f$ is detected and fed back as a state variable to the APC system. Similarly, the feed water flow rate is adjusted by means of the boiler feed pump BFP in compliance with a feed water flow rate command value $FWF_c$ given as a manipulated variable from the APC system, while the actual feed water fuel flow rate $FWF_f$ is detected and fed back as a state variable to the APC system. The flow rate of the sprayed water is adjusted by means of a spray valve in compliance with a superheater spray command value SP given as a manipulated variable from the APC system, while the main steam temperature MST is detected and fed back as a state variable to the APC system. The position or opening of the gas damper GD is adjusted in compliance with a gas damper position command value GD given as a manipulated variable from the APC system, while the reheater steam temperature is detected and fed back as a state variable to the APC system. In addition to the manipulated variables $FWF_c$, SP, $FIR_c$, $AIR_c$ and GD which themselves are applied to final control elements, there is a manipulated variable, a firing rate command value FR, which acts to determine other manipulated variable(s). The blocks 23-28 provided at the lines (conductors) carrying the manipulated variables are stations which permit selection between automatic control and manual control. The blocks with a mark "Σ" are adders. The blocks with a mark "K" are proportional elements. The blocks with a mark "D" are differential elements. The blocks with a mark "∫" are integral elements. The blocks with a mark "K+∫" are proportional plus integral elements. The blocks with a mark "f" are function generators. MWD denotes a load demand. $MST_s$ denotes a main steam temperature set value. $RHT_s$ denotes a reheater steam temperature set value.

It will be seen that each of the manipulated variables is determined not necessarily from one state variable but the loops for determining the manipulated variables are interrelated.

Although not shown in FIG. 2B, a main steam pressure MSP is also detected and fed back as a state variable to the APC system and used for the control.

Control by the APC system alone has however the following limitations.

(1) While the characteristics of an electric power plant have non-linearity having the load as a parameter, the parameters of the PID actions determining the control capability usually have only a single pattern.

(2) A main disturbance to a thermal power plant in its normal operation is variation in the load. The heat capacity of a boiler varies depending on the load. In an attempt to compensate for the variation of the heat capacity, a boiler input accelerating signal BIR (FIG. 2B) is added to increase the fuel in advance of the predicted temperature drop. But this alone is not sufficient.

(3) In recent years, there is an increasing demand on a thermal power plant for improvement in load response capability, particularly improvement in the load variation rate, but realization of such improvement is obstructed by limitation in the control capability of some of the plant state variables, particularly the main steam temperature and the reheater steam temperature.

In an attempt to solve these problems, a direct digital control system (hereinafter referred to as DDC system) is used to realize optimum control over an electric power plant, using a control model formed of a mathematical model representing or expressing the thermal power plant as being controlled by the APC system and hence to realize complementary control. By such complementary control, the control capability of the main steam temperature and the reheater steam temperature have been substantially improved. FIG. 3 shows a system where an autoregressive model (hereinafter referred to as AR model) is used as the mathematical model.

But before further describing the optimum control system shown in FIG. 3, description on an AR model used as a mathematical control model is given.

An AR model with respect to a single variable is expressed by the following equation (1).

$$x(s) = \sum_{m=1}^{M} a(m)x(s - m) + u(s) \quad (1)$$

where s represents a sampling instance, it being assumed that sampling of the plant variables is conducted at a regular interval, x(s) represents the state variable at the sampling instance s, a(m) represents an AR model coefficient, M represents the order of the AR model, and u(s) represents a white noise at the sampling instance s.

A series of the values of u(s) for successive sampling instances s constitute a white noise series.

If one expands the above equation of the AR model for a single variable, one obtains an equation (2) of the AR model for multiple variables, viz., $$X(s) = \sum_{m=1}^{M} A(m)X(s - m) + U(s) \quad (2)$$

where s represents a sampling instance,

X(s) represents a multiple state variable vector,

A(m) represents an AR model coefficient matrix,

M represents the order of the AR model, and

U(s) represents a white noise vector

When the combination of the thermal power plant and the APC system controlling the thermal power plant is to be expressed by a mathematical model, the expanded AR model (expressed by the equation (2)) can be used. Determination of the coefficient matrix is called "identification". It essentially consists of two steps, namely (1) an identification test for collecting dynamics data of the thermal power plant under control of the APC system, and (2) modelling for determining the AR model coefficient matrix.

The data collection for the identification test is conducted by applying, to the respective manipulation terminals of the plant 1 being controlled by the APC system 2 as shown in FIG. 4, white noises WN independent of each other, e.g., M series (maximum length linear shift register sequences), from a white noise generating unit 90, and by collecting time series of the manipulation variables MV and the state variables FB of the plant by a data collecting unit 91. Thus the dynamics data concerning the controlled object 5 for the DDC system, i.e., the thermal power plant being controlled by the APC system are collected.

The determination of the multiple variable AR model coefficient matrix A(m) for the modelling, together with determination of the order M of the AR model is conducted in accordance with the dynamics data of the controlled object 5 collected by the identification test and by means, e.g., of TIMSAC (time series analysis and controller design program) library.

When an AR model is used for DDC, it is better in the modelling to divide the variables into the state variables of the plant (feedback information of pressure, temperature, flow rate and the like) and the manipulated variable to be applied to the plant (control information of firing rate command value, spray valve position command and the like) because such division makes easier the arithmetic operation to be conducted at each sampling instance. Therefore, the AR model is expressed by the following expression (3) using state vector Z and the manipulation vector Y.

$$\hat{Z}_i(s+1) = B(i)Z_0(s) + \hat{Z}_{i+1}(s) + C(1)Y(s) \quad (3)$$

where i = 0, 1, 2, ..., M−1, M being the order of the AR model,

B represents the AR model coefficient matrix for the state vector Z,

C represents the AR model coefficient matrix for the manipulation vector Y, $\hat{Z}_0(s+1)$ represents predicted values of the state vector $Z_0(s+1)$ for the sampling instance (s+1), i.e., the sampling instance immediately subsequent to the sampling instance s.

When the above expression of the equation (3) is used, the identification comprises determination of the order M of the AR model, and determination of the AR model coefficient matrixes B and C. Thus the combination of the thermal power plant 1 and the APC system 2 controlling the thermal power plant 1 is expressed by a control AR model 4.

Then optimum manipulation vector G which minimizes an evaluation function J defined by the following equation (4):

$$J = \sum_{i=1}^{K} \{X^T(i)QX(i) + Y^T(i - 1)RY(i - 1)\} \quad (4)$$

where

K represents the evaluation time, $X^T(i)$ represents a transposed matrix of X(i), Q represents a weighting factor matrix of the state vector, $Y^T(i-1)$ represents a transposed matrix of Y(i−1), and R represents a weighting factor matrix of the manipulation vector, is determined in advance using the control AR model 4 expressed by the equation (3). At each sampling instance during on-line control, a value given by $$Y(s+1) = G \cdot Z(s+1)$$

is added to the APC system output to determine the value of the manipulated variable.

A single control loop for such optimum control is shown in FIG. 5.

The DDC system 3 supplies a time width output of either INC (increase) or DEC (decrease) responsive to the value (supplementary manipulated value) determined by the DDC system 3 to an analog memory (AM) 230 whose output DCT, which is a voltage signal having a magnitude and a sign indicative of the supplementary value, is added to the output of the APC system 2 at the adder 231, and the sum is used as a set value to be applied to a setting device 232, which in turn produces a manipulated variable MV. In such an optimum control system, the output ACT of the APC system 2 is determined as a result of the PID arithmetic operation and is normally not of an excessive value, while the output DCT of the DDC system 3 may become excessive for the plant.

It is therefore necessary to provide a supervising system to conduct supervision of the plant. An example of supervising system is shown in FIG. 6. In this system, (1) differences between predicted values $\hat{Z}(s+1)$ of the state variables at the next (immediately subsequent) sampling instance predicted by the control AR model 4 based on the actual plant variables at the sampling instance s and the actual values $Z(s+1)$ are, upon demand from the operator, displayed on a display device 310, in the form of trend output, and (2) each of the manipulated variables MV as applied to the plant is compared with a variable limit value which varies depending on the load command in a manipulated variable supervising unit 311, which judges that the manipulated variable MV is abnormal when it exceeds the limit value, and causes the display device 310 to produce an alarm output and cause the manipulated variable to resume the value at the immediately preceding sampling instance.

But the determination of the limit values, which must of course be done taking into consideration the characteristics of the plant, is a difficult task. It has been done relying on experience of operation and it has been difficult to make sure that the set values are appropriate. It has therefore been difficult to conduct objective or consistent diagnosis on the manipulated variables. Moreover, although use of the control AR model 4 enables prediction of the state variables FB, it was not possible to make prediction of the manipulated variables MV.

In another conventional system, a diagnostic model in the form of an AR model representing the combination of the plant and the APC system constituting the diagnosed object and expressed by:

$$\hat{Z}(s+1) = \sum_{m=1}^{M} A(m)Z(s+1-m) \quad (5)$$

is used to produce, based on the actual state variables at the sampling instance s, predicted values $\hat{Z}(s+1)$ for the next sampling instance $(s+1)$. At the next sampling instance $(s+1)$, the differences between the predicted values $\hat{Z}(s+1)$ and the actual state variables $\hat{Z}(s+1)$ are determined by:

$$E(s+1) = Z(s+1) - \hat{Z}(s+1) \quad (6),$$

and the whiteness level of time series of the differences $E(s+1)$ is tested according to the auto-correlation function of the series and occurrence or nonoccurrence of abnormality is judged by such test. In this way, diagnosis of the plant is conducted. But such diagnosis is not satisfactory for a thermal power system, which is a dynamic system where a large number of variables are interrelated and a single fault may cause abnormalities in two or more variables. No diagnosing system has so far been realized which is capable of providing information on the cause of abnormality and permitting continuous supervision of the change of the degree of abnormality in real time (on on-line basis) and dynamically, i.e., as a function of time. Neither has any diagnosing system for the plant system with the APC system as well as the DDC system been realized.

SUMMARY OF THE INVENTION

An object of the invention is to provide a method and a system which is capable of detecting occurrence of an abnormality of a plant during on-line control and producing an alarm output.

Another object of the invention is to provide a method and a system which is capable of setting an alarm level suitable for objective or consistent diagnosis in a supervision of differences of predicted values to make sure that the manipulated variables are of appropriate values in an optimum control.

A further object of the invention is to enable detection or location of the cause of an abnormality.

A still further object of the invention is to enable exclusion of the DDC system from the control when a fault is detected.

According to one aspect of the invention, there is provided a method for diagnosing a thermal power plant system including a thermal power plant, provided with an automatic power plant control system receiving to feedback signals of state variables of the plant and performing PID control, a control model formed of a mathematical model representing the combination of the plant and the automatic power plant control system, and a direct digital control system utilizing the control model and controlling the plant to conduct an optimum control, the automatic power plant control system and the direct digital control system conducting control complementarily, said method comprising the steps of:

providing a plant diagnostic model formed of a mathematical model representing the combination of the plant, the automatic power plant control system, the control model and the direct digital control system, determining predicted values of the plant variables, by means of the plant diagnostic model, determining a difference between the predicted value of each of the plant variables and the actual value of the same plant variable, storing the determined difference successively thereby to provide a time series of the differences which have been successively determined, determining whiteness indexes used for testing the whiteness level of the time series of the differences in accordance with the time series of the differences, judging whether or not any of the plant variables is abnormal in accordance with the whiteness indexes, judging whether or not any of the manipulated variables is faulty in accordance with the whiteness indexes and the result of judgement as to abnormality, and outputting an alarm when an abnormality or a fault is detected.

According to another aspect of the invention, there is provided a system for diagnosing a thermal power plant system including a thermal power plant, provided with an automatic power plant control system receiving to feedback signals of state variables of the plant and performing PID control, a control model formed of a mathematical model representing the combination of the plant and the automatic power plant control system, and a direct digital control system utilizing the control model and controlling the plant to conduct an optimum control, the automatic power plant control system and the direct digital control system conducting control complementarily, the diagnosing system comprising:

a plant diagnostic model formed of a mathematical model representing the combination of the plant, the automatic power plant control system, the control model and the direct digital control system, the diagnostic model being used to determine predicted values of the plant variables, difference determining means determining a difference between the predicted value of each of the plant variables and the actual value of the same plant variable, whiteness index calculating means storing the determined difference successively thereby to prepare a time series of the differences which have been successively determined, and determining whiteness indexes used for testing the whiteness level of the time series of the differences in accordance with the time series of the differences, abnormality detecting means judging whether or not any of the plant variables is abnormal in accordance with the whiteness indexes, fault detecting means judging whether or not any of the manipulated variables is faulty in accordance with the whiteness indexes and the result of judgement as to abnormality, and an alarm device outputting an alarm when an abnormality or a fault is detected.

BRIEF DESCRIPTION OF THE DRAWINGS

In the accompanying drawings:

FIG. 13 shows an example of printer output, illustrative of how the trend of the whiteness index is depicted.

DETAILED DESCRIPTION OF THE PREFERRED EMBODIMENTS

Figure 7:
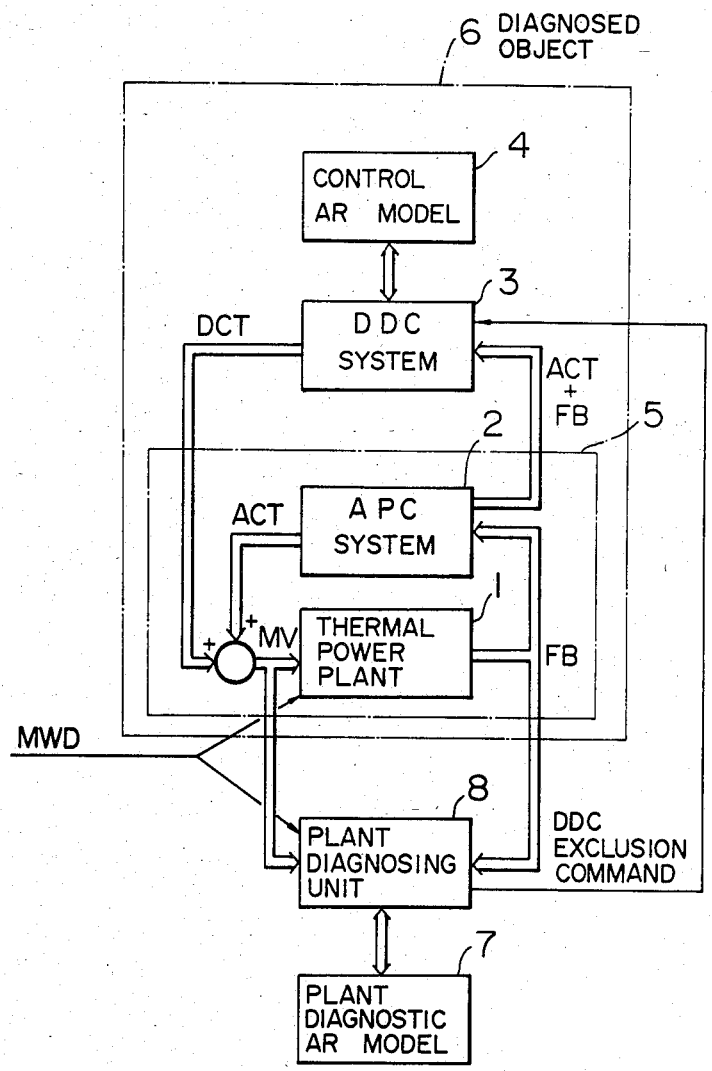
FIG. 7 is a block diagram showing an embodiment of a plant diagnosing system according to the invention.

FIG. 7 shows a plant system provided with a plant diagnosing system of an embodiment of the invention. A combination of a thermal power plant 1 and an APC system 2 controlling the thermal power plant 1 is called a controlled object 5, and a control AR model 4 is a representation or expression of the controlled object 5 by a mathematical model in the form of an AR model.

It should be noted that the control model may alternatively be any other mathematical model by which the values for the next sampling instance can be predicted, e.g., an ARMA (AR moving average) model. The ARMA model is expressed by the following equation.

$$x(s) = \sum_{m=1}^{M} a(m)x(s-m) + \sum_{n=1}^{N} b(n)u(s-n) \quad (7)$$

where s, x(s), a(m), M and u(s) have the same significances as are already described, b(n) represents coefficients for u(s), with b(1)=1. It is most common to use an ARMA model to describe usual steady-state stochastic process. But for the purpose of control, an AR model is advantageous in that program development is easier while it is sufficiently satisfactory for practical use, so that AR models are widely used in usual DDC systems.

Figure 8:
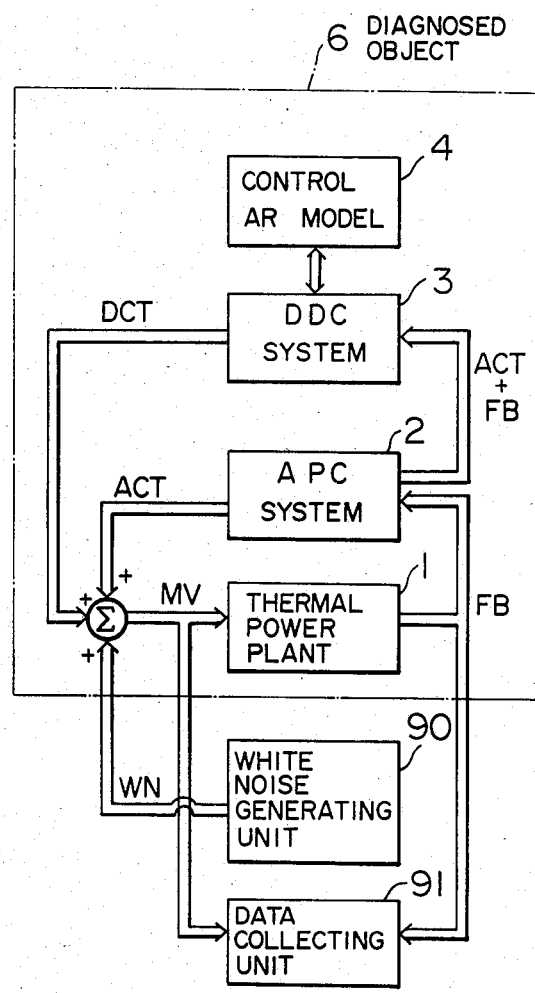
FIG. 8 is a block diagram showing a white noise generating unit and a data collecting unit used for identification of the diagnosed object.

The plant diagnosing system of the embodiment comprises a diaghostic AR model 7 and a plaht diagnosing unit 8. The diagnostic AR model 7 is a mathematical model of a diagnosed object 6 consisting of the control object 5, the DDC system 3 and the control AR model 4. The diagnostic AR model 7 is determined much the same way as the control model. As shown in FIG. 8, white noises WN from a white noise generating unit 90 are superimposed on the respective sums of the outputs ACT of the APC system 2 and the outputs DCT of the DDC system 3, and the manipulated variables MV as applied to the plant 1 and the state variables FB from the plant 1 are collected by a data collecting unit 91, and the AR model coefficient matrix and the order of the model are determined in accordance with the collected data. The calculation for the determination of the coefficient matrix and the order of the model is conducted on off-line basis.

The diagnosed object 6 generally has non-linear characteristic. To adapt the system to the non-linearity, separate identification tests are conducted for different values of load, e.g., for a low load, for a middle load and for a high load, and separate AR coefficient matrixes Al, Am and Ah of linear AR models are determined and stored. In operation, interpolation is made using the stored coefficient matrixes to determine, every sampling instance, an AR coefficient matrix A(m) of an AR model suitable for any given load with which errors due to uncertainty of the AR model with respect to the non-linear object can be ignored.

The plant diagnosing unit 8 receives the manipulated variables MV and the state variables FB from the diagnosed object 6 and predicted values of the manipulated variables MV and the state variables FB from the diagnostic model 7, and performs judgement as to occurrence of an abnormality (detection of an abnormality), detection of a fault, an alarm output to call the attention of the operator, and production of a command for exclusion of the DDC system from control.

It should be noted that it is not necessary to use all the plant variables (manipulated variables and the state variables) for the diagnosis, but use of some major plant variables only may be sufficient. In identifying the plant diagnostic model, white noises are superimposed on only those manipulated variables which are to be used for the diagnosis and data of only those plant variables which are to be used for the diagnosis are need to be collected.

Figure 9:
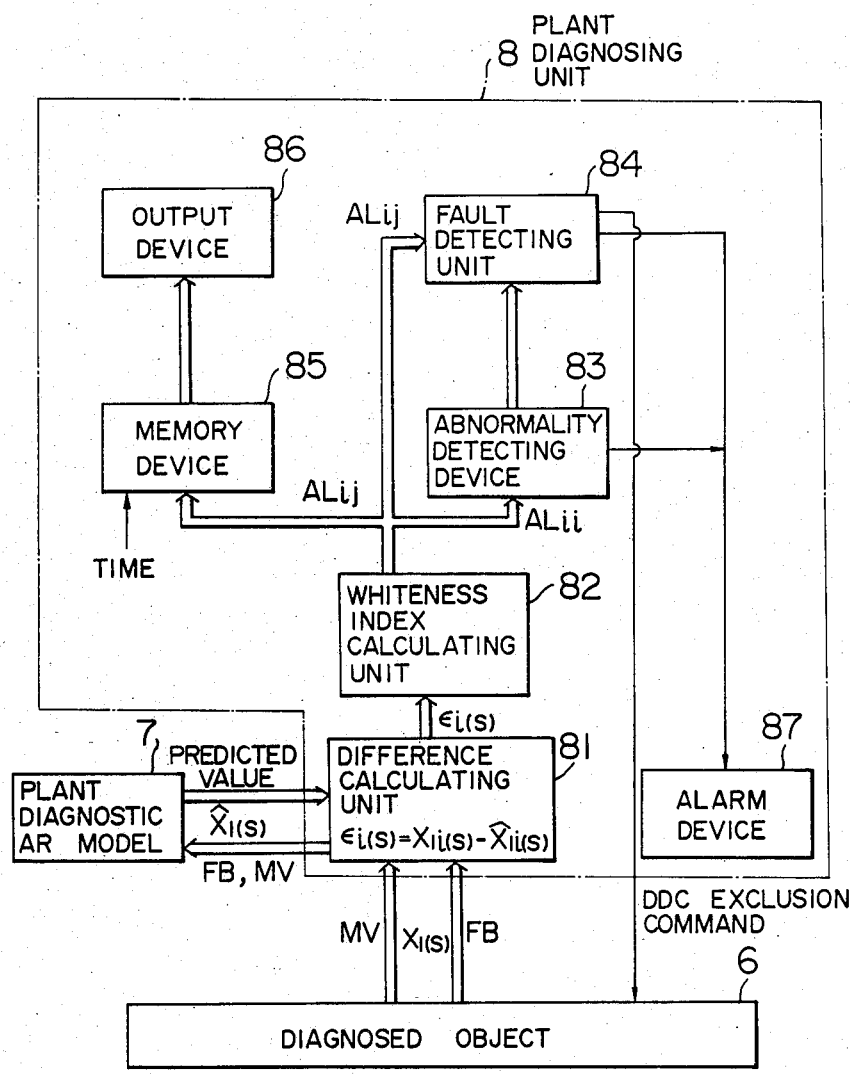
FIG. 9 is a block diagram showing in detail an example of a block diagnosing unit.

FIG. 9 shows in detail an example of plant diagnosing unit 8, which comprises a difference calculating unit 81, a whiteness index calculating unit 82, an abnormality detecting unit, a fault detecting unit 84, a memory device 85, an output device 86 and an alarm device 87.

The plant diagnostic AR model 7 receives the actual values of the manipulated variables MV and the state variables FB (via the difference calculating unit 81) from the diagnosed object 6 every sampling instance, and determines, based on a state vector consisting of the manipulated variables MV and the state variables FB, viz., $$\hat{X}_1(s) = \begin{pmatrix} MV \\ FB \end{pmatrix}$$

the predicted value of the state vector for the next sampling instance (s+1), in accordance with the equation (8).

$$\hat{X}_1(s+1) = \sum_{m=1}^{M} A(m) X_1(s+1-m) \qquad (8)$$

The newly predicted values $\hat{X}_1(s+1)$ are stored in a one-sample buffer, while the predicted values $\hat{X}_1(s)$ calculated one sampling interval before (at the immediately preceding sampling instance) are outputted and supplied to the difference calculating unit 81.

The difference calculating unit 81 receives the manipulated variables MV and the state variables FB and prepares a state vector $$X_1(s) = \begin{pmatrix} MV \\ FB \end{pmatrix}$$

The difference calculating means 81 also receives the predicted values $\hat{X}_1(s)$ of the state vector from the diagnostic AR model 7, and determines the differences $\epsilon_i(s)$ in accordance with the following equation (9).

$$\epsilon_i(s) = \hat{X}_{1i}(s) - X_{1i}(s) \qquad (9)$$

where
i denotes the specific item of the variable,
$X_{1i}(s)$ represents the i-th element of $X_1(s)$, and
$\hat{X}_{1i}(s)$ represents the i-th element of $\hat{X}_1(s)$.
Each item of the matrix corresponds to the specific plant variable.

The resultant differences $\epsilon_i(s)$ are supplied to the whiteness index calculating unit 82. The differences $\epsilon_i(s)$ may comprise errors due to the inaccuracy of the model as well as deviations due to physical disturbance to the plant. But since it is ensured that the former is negligible by proper modelling including provision of plural models and interpolation for adaptation to non-linearity, it may be regarded that each difference $\epsilon_i(s)$ consists solely of the deviation due to physical disturbance to the plant.

The deviations due to the physical disturbance entering the plant consist of white noises, as far as the diagnosed object is normal. For this reason, by checking whether or not a time series of the differences $\epsilon_i(s)$ is white, it is possible to judge whether or not the diagnosed object 6 is normal. To judge whether or not the differences $\epsilon_i(s)$ are white, whiteness level indexes are calculated and checked.

The whiteness index calculating unit 82 receives the differences $\epsilon_i(s)$ from the difference calculating unit 81 and store the differences $\epsilon_i(s)$ to form a time series (or succession) of differences $\epsilon_i(s)$ for each plant variable (specific i). The number N of the differences of the time series is chosen to be sufficient from statistical viewpoint. The whiteness index calculating unit 82 determines, from the time series of differences, whiteness indexes $AL_{ij}$, in accordance with the following equation (10).

$$AL_{ij} = \left| \frac{\sum_{s=1}^{N-1} \epsilon_i(s) \cdot \epsilon_j(s+1)}{\sqrt{\sum_{s=1}^{N-1} \epsilon_i(s)^2} \cdot \sqrt{\sum_{s=1}^{N-1} \epsilon_j(s+1)^2}} \right| \qquad (10)$$

where i and j represent the item numbers (allotted to the plant variables) of the differences.

The whiteness index $AL_{ij}$ (for the specific item numbers i and j) represents a correlation between differences of two items, or the degree of effect of the difference $\epsilon_i(s)$ of the i-th element of the state vector $X_1$ at a given sampling instance s on the differences $\epsilon_j(s+1)$ the j-th element of the state vector $X_1$ at the time of the next sampling instance (s+1).

The denominator in the equation (10) is introduced for the purpose of normalization in view of the fact that the signals of different items may have different dimensions.

$AL_{ij}$ with i=j, i.e., $AL_{ii}$ represents an autocorrelation function, while $AL_{ij}$ with i≠j represents a cross-correlation function.

In view of the causality in the electric power plant, it is unnecessary to consider effect of a state variable on a manipulated variable, so that only those cross-correlation functions which represent effect of a manipulated variable on a state variable, i.e., $AL_{ij}$ with i being an item number of a manipulated variable and j being an item number of a state variable are calculated. This makes it possible to reduce the time necessary for calculation of the correlation functions.

When the diagnosed object 6 is normal, a time series of differences $\epsilon_i$ of a specific plant variable is independent of a time series of differences of another plant variable, and is white, so that the whiteness index $AL_{ij}$ is of a normal distribution with its average value being 0. Upon occurrence of an abnormality in the diagnosed object, the time series of differences $\epsilon_i$ begins to have correlation and is nor longer white, i.e., is "colored", so that the whiteness index $AL_{ij}$ becomes larger.

The whiteness indexes $AL_{ij}$ determined by the whiteness index calculating unit 82 are supplied to the memory device 85, an abnormality detecting unit 83 and the fault detecting unit 84.

The memory device 85 receives the whiteness indexes $AL_{ij}$ from the whiteness index calculating unit 82 and stores the indexes together with time data separately supplied thereto. The successions of indexes $AL_{ij}$ calculated at a fixed number of different sampling instances s are stored. When a new set of indexes $AL_{ij}$ are calculated, the oldest set of indexes (i.e., the indexes calculated at the earliest sampling instance among those stored) are abandoned and the newly calculated indexes are stored in place. In other words, the memory device 85 updates the successions of the indexes each time a new set of indexes are calculated.

When the abnormality detecting unit 83 detects an abnormality, the memory device 85 is notified of such detection and supplies the stored data to the output device 86 which is for example a line printer, and causes the output device 86 to output (print out) the data. From the output data, it is possible for the operator to have the record and to analyze the data.

The abnormality detecting unit 83 receives the indexes $AL_{ii}$ representing the auto-correlation functions from the whiteness index calculating means 82 and tests the whiteness level of each index $AL_{ii}$. First, a hypothesis (null hypothesis) to the effect that $AL_{ii}$ indicates non-correlation is assumed. Since the number N of data for determining each $AL_{ii}$ is sufficiently large, $AL_{ii}$ (its probability) is of a normal distribution and the average (expectation) is 0. Therefore, the upper limit or alarm level ALARML for $AL_{ii}$ above which the hypothesis is nullified, i.e., it cannot be said that the $AL_{ii}$ indicates non-correlation is, if the level of significance is chosen to be 5%, given by the following equation.

$$ALARML = \frac{1.96}{\sqrt{N}} \qquad (11)$$

Here the denominator $\sqrt{N}$ is to make correction for the fact that the number N of data used for determining $AL_{ii}$ is a finite number. If it is found that $$AL_{ii} > ALARML \qquad (12)$$

it is judged that there is an abnormality.

When any of the manipulated variables MV and the state variables FB is found abnormal, the item number of such a variable is notified to the fault detecting unit 84 and to the alarm device 87 (e.g., a CRT display device), which then produces an alarm message to call the attention of the operator. The alarm message may for example comprise time     name ABNORMAL     —P.DIAG—
Here "time" represents the time at which the abnormality is detected, "name" represents the name (in abbreviation) of the manipulated variable or the state variable having been found abnormal, and "—P.DIAG—" signifies that the message is from the diagnosing system. This is added on the assumption that the alarm device 87, particularly its CRT device, is shared by other systems, not shown. The alarm message is kept displayed for a certain time period.

The fault detecting unit 84 receives from those of the whiteness indexes representing auto-correlation functions $AL_{ij}$ ($i \neq j$) and also receives from the abnormality detecting unit 83 the item number or numbers of the plant variables having been found abnormal, and judges whether or not each of those cross-correlation functions $AL_{ij}$ which represents effect on the time series of differences of the state variable having been found abnormal indicates that the two difference series are non-correlated, and whether or not any fault has occurred.

The judgement or test as to whether or not $AL_{ij}$ indicates that the two difference series are non-correlated is made in accordance with the following inequality similarly as in the test of the auto-correlation functions.

$$AL_{ij} > ALARM \qquad (13)$$

If the level of significance is chosen to be 5% as it was for the auto-correlation functions, then $$ALARM = \frac{1.96}{\sqrt{N}} \qquad (14)$$

If the inequality (13) is satisfied, it is judged that $AL_{ij}$ indicates that the two difference series are correlated.

The judgement as to whether or not any fault has occurred is made according to the following criterion. Namely, if any of the state variables is found abnormal, and any of the manipulated variables is found abnormal, and the auto-correlation function representing the effect of the manipulated variable having been found abnormal or the state variable having been found abnormal is found to indicate that the two difference series are correlated, then it is judged that the abnormality of the state variable FB is due to the abnormality of the manipulated variable MV, and such abnormality of the manipulated variable MV is recognized as a fault. In other words, a fault is defined as an abnormality in a manipulated variable causing an abnormality in a state variable.

When a fault is thus detected, the fault detecting unit 84 issues a command to cause the DDC system 3 to be excluded from control and the thermal power plant 1 to be controlled solely by the APC system 2.

The fault detecting unit 84 also causes the alarm device 87 to display an alarm message to notify the operator. An example of the alarm message is in the following format.

time name 1 ABNORMAL. PLEASE CHECK name 2
-P.DIAG-

Here

"time" represents the time at which the fault is detected,

"name 1" represents the name of the state variable which has been found abnormal, "name 2" represents the name of the manipulated variable which has been found to be causing the abnormality in the state variable of "name 1" and has hence been recognized as being faulty.

Figure 1:
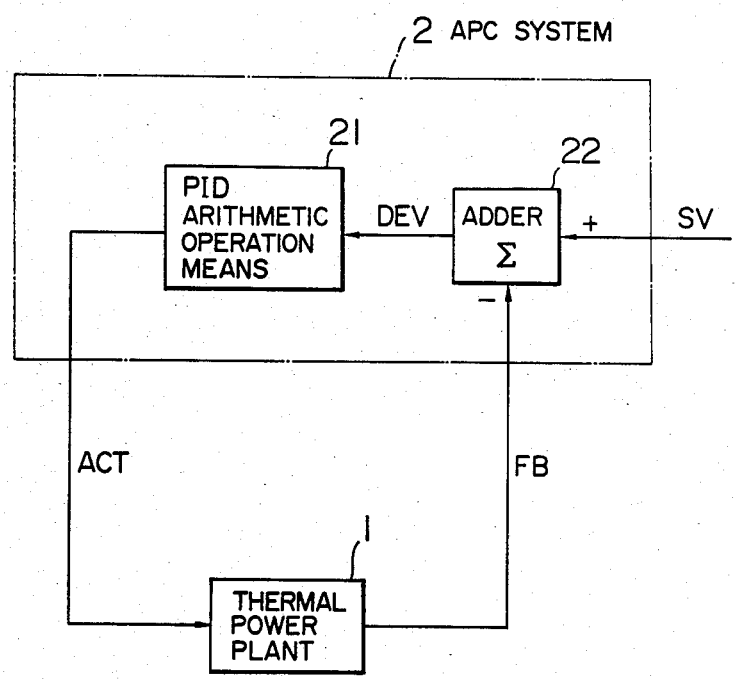
FIG. 1 is a block diagram showing a thermal power plant and an APC system, with only a single control loop being illustrated.
Figure 2A:
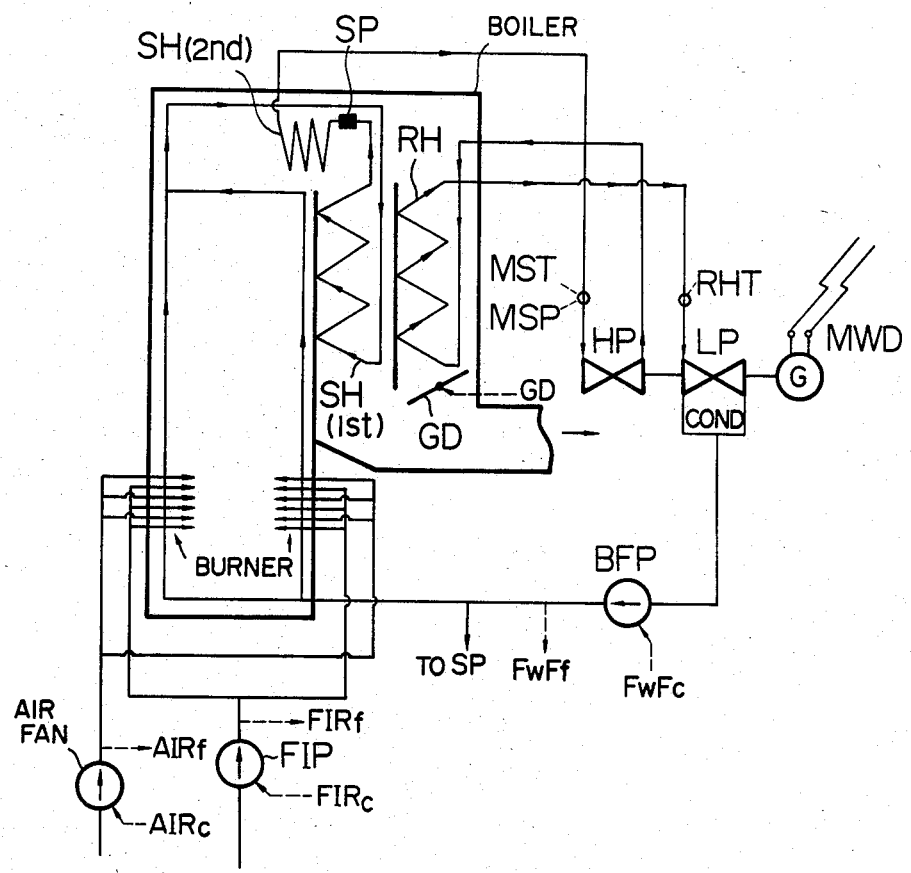
FIG. 2A shows a general arrangement of an example of a thermal power plant.
Figure 2B:
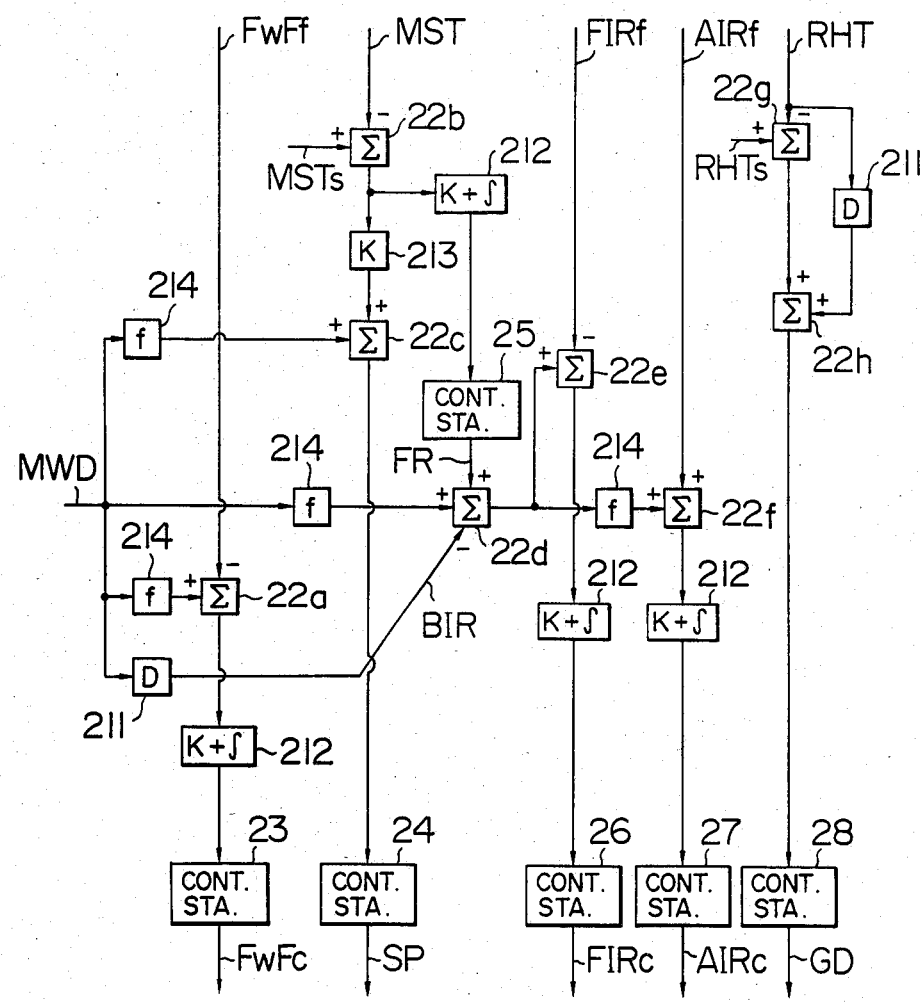
FIG. 2B is a block diagram showing an example of an APC system suitable for control of the plant shown in FIG. 2A.
Figure 3:
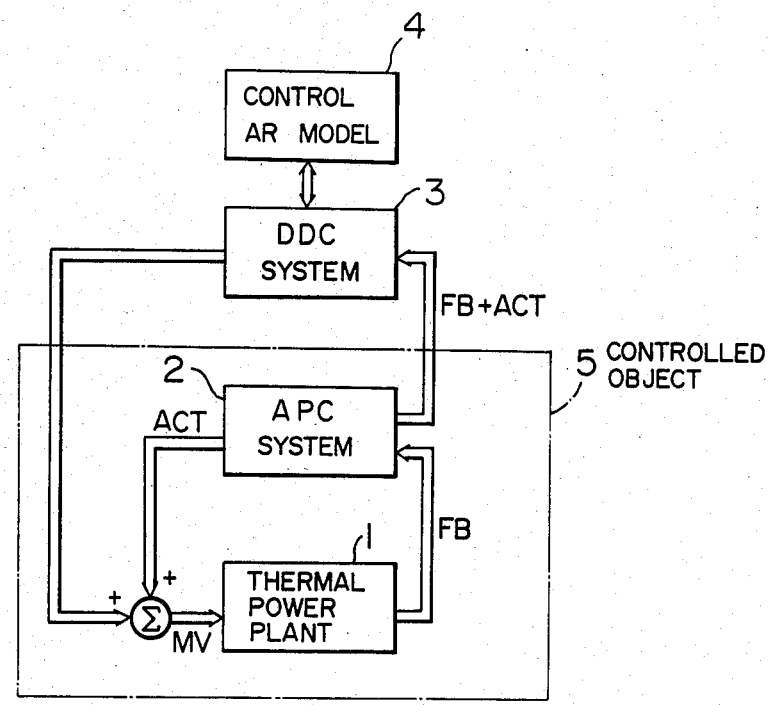
FIG. 3 is a block diagram showing a DDC system used in conjunction with an APC system to conduct optimum control.
Figure 4:
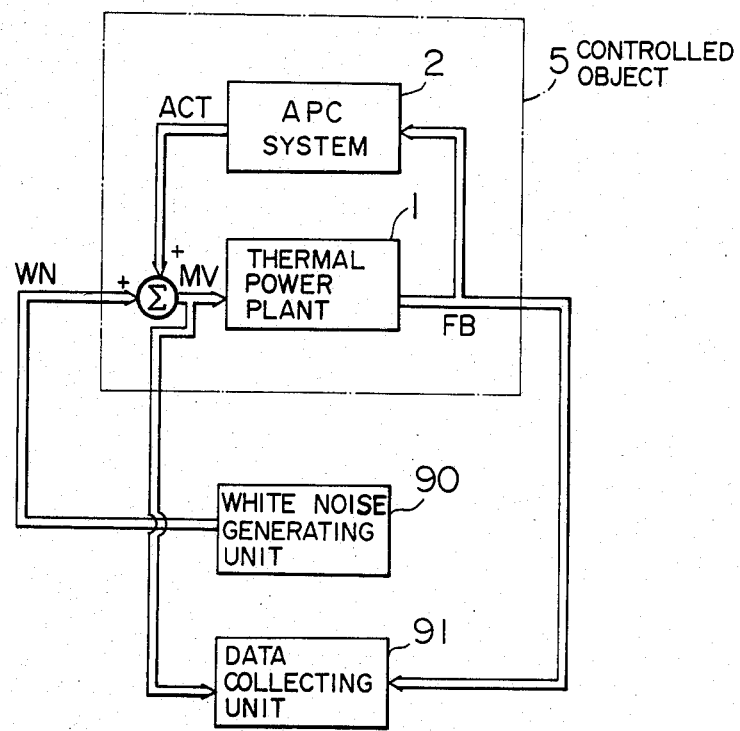
FIG. 4 is a block diagram showing a white noise generating unit and a data collecting unit used for identification of the controlled object.
Figure 5:
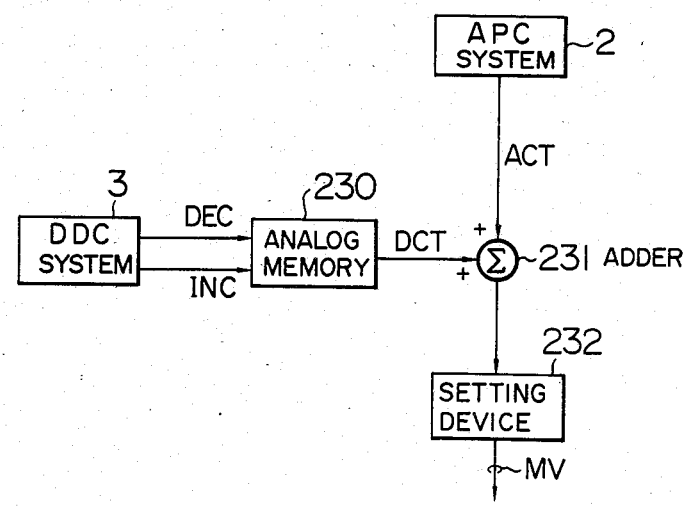
FIG. 5 is a block diagram illustrative of addition of the outputs of an APC system and a DDC system to determine the manipulated variable.
Figure 6:
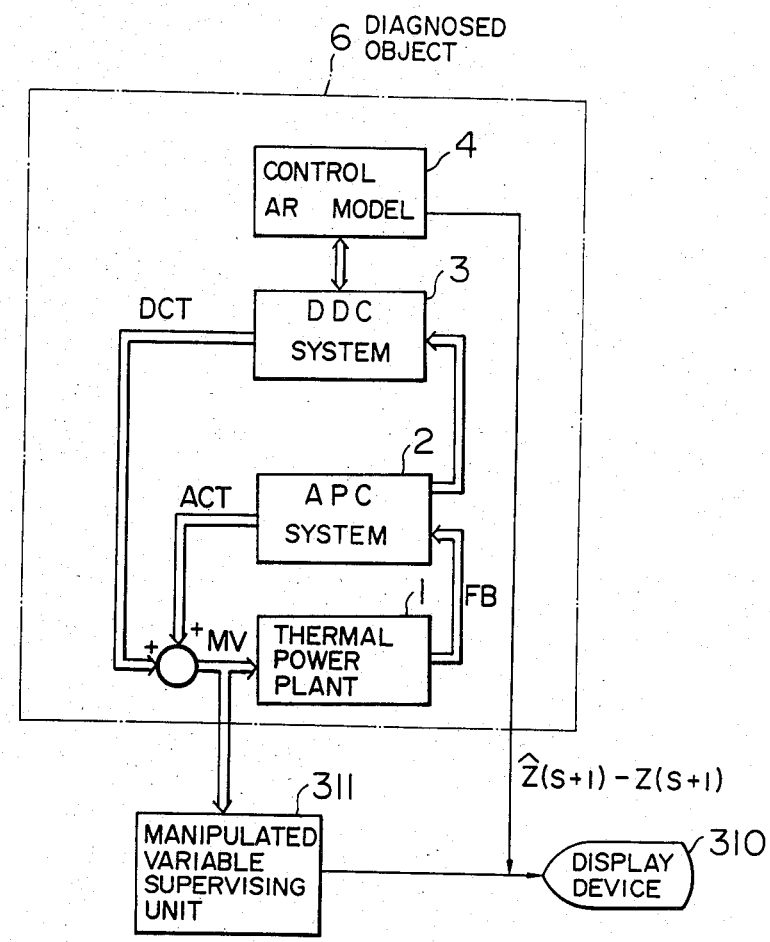
FIG. 6 is a block diagram showing a conventional diagnosing system.
Figure 10:
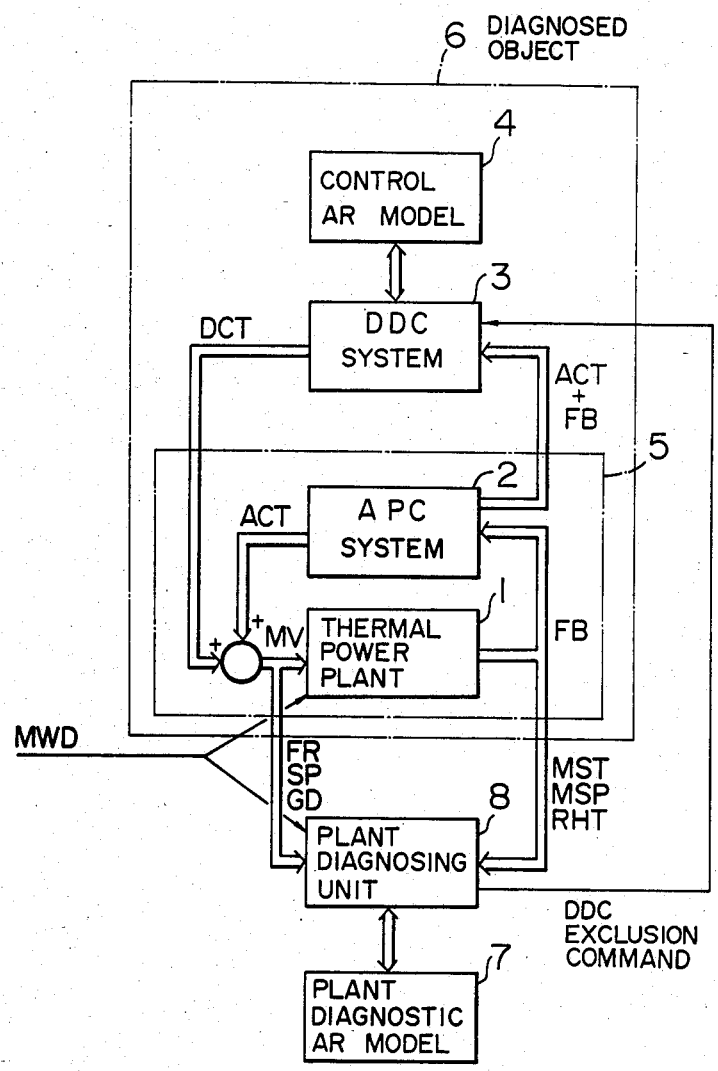
FIG. 10 is a block diagram similar to FIG. 7 but with the specific variables used for diagnosis of the specific example of a plant.

FIG. 10 shows an example of a plant diagnosing system adapted for diagnosing a thermal power plant shown in FIG. 2A. In this example, three manipulated variables MV, namely the firing rate FR, the superheater spray valve position command value SP, and the reheater gas damper position command value GD, and three state variables FB, namely the main steam temperature MST, the main steam pressure MSP and the reheater steam temperature RHT are inputted and the diagnosis is made in accordance with these inputted data. The plant diagnostic AR model 7 is adjusted responsive to the particular load demand MWD by means of interpolation.

Figure 11:
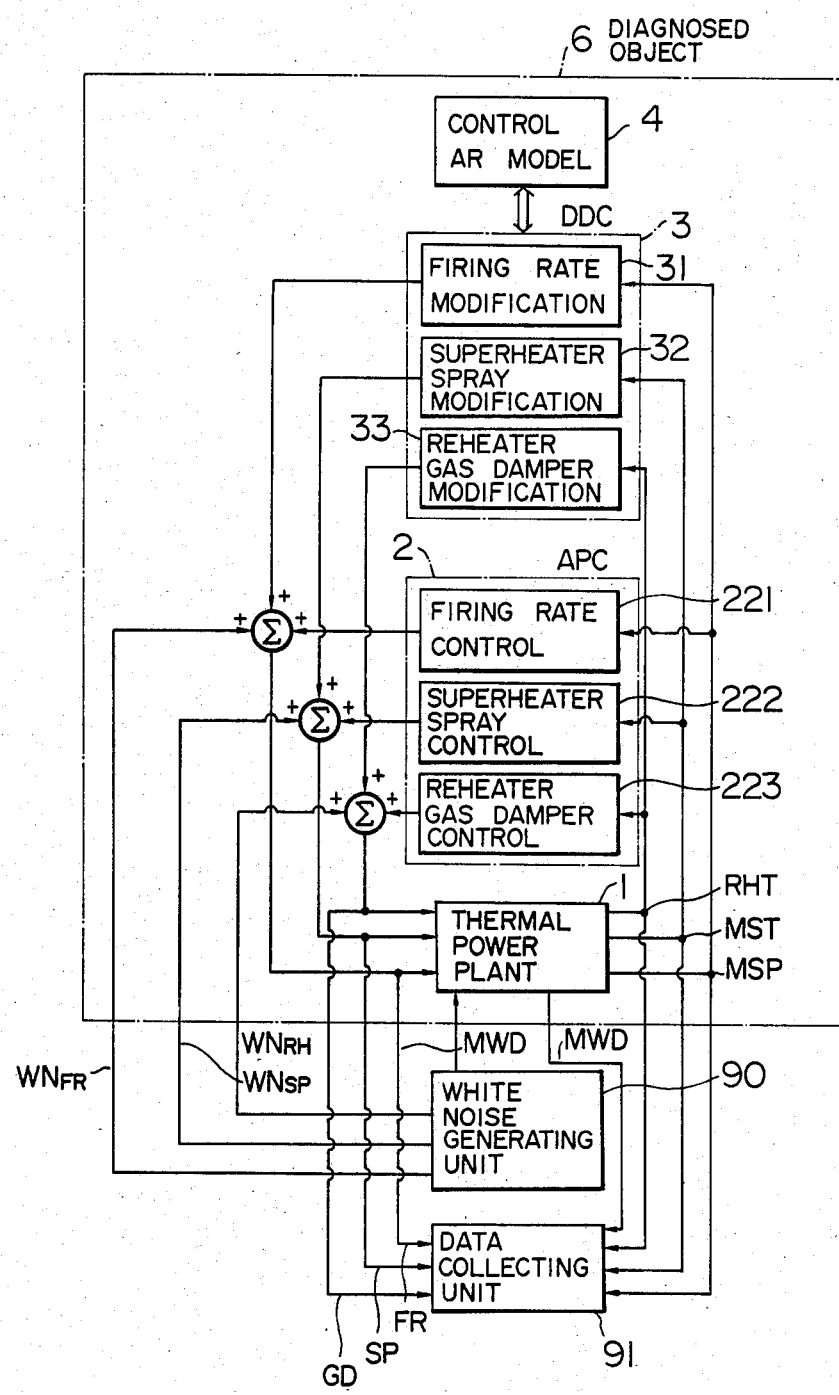
FIG. 11 is a block diagram similar to FIG. 8, but in connection with a specific diagnosed object.

FIG. 11 shows how identification of the plant diagnostic AR model 7 suitable for the system of FIG. 10 is conducted. As illustrated, white noises independent of each other from a white noise generating unit 90 are superimposed on the sums of the outputs of the APC system 2 and the DDC system 3 and the values of the manipulated variables MV, namely the firing rate command value FR, the superheater spray valve position command value SP and the gas damper position command value GD containing the superimposed white noises, and the values of the state variables FB, namely the main steam temperature MST, the main steam pressure MSP, and the reheater steam temperature RHT are collected, and the coefficient matrix A(m) of the AR model of the equation (2) is determined. In this way, the plant diagnostic AR model 7 is identified. It should be understood that plural (e.g., three) coefficient matrixes are determined for different values (low, middle, and high values) of load.

Figure 12:
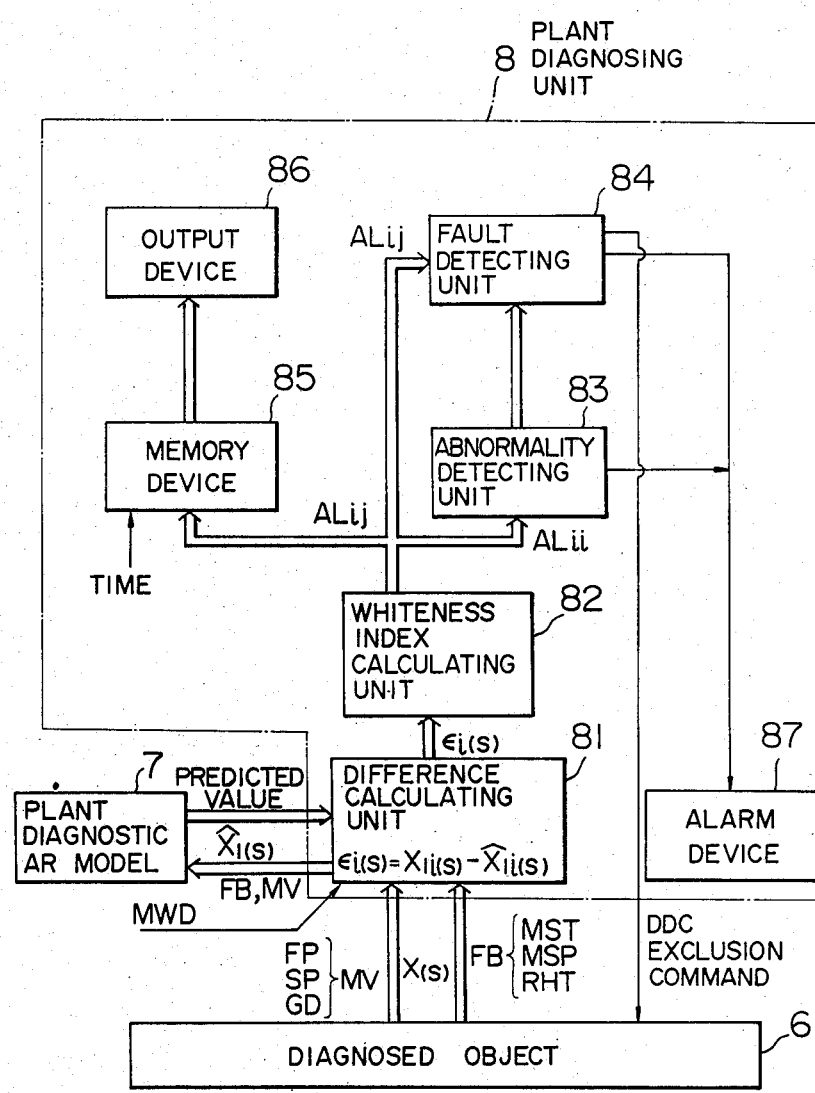
FIG. 12 is a block diagram similar to FIG. 9, but of a specific example of diagnosing unit.

FIG. 12 shows an example of the plant diagnosing unit 8 suitable for the system of FIG. 10. The coefficient matrix of the plant diagnostic AR model 7 is adjusted responsive to the load demand MWD by means of interpolation. The manipulated variables MV, namely the firing rate command value FR, the superheater spray valve position command value SP and the reheater gas damper position command value GD, and the state variables FB, namely the main steam temperature MST, the main steam pressure MSP and the reheater steam temperature RHT are inputted through the difference calculating unit 81 to the plant diagnostic AR model 7. Then a state vector $X_1$ formed of the inputted variables, i.e., $$X_1(s) = \begin{bmatrix} FR \\ SP \\ GD \\ MST \\ MSP \\ RHT \end{bmatrix}$$

is used to determine predicted values $\hat{X}_1(s+1)$ of the state vector for the next sampling instance (s+1) in accordance with the following equation.

$$X_1(s+1) = \sum_{m=1}^{M} A(m) \cdot X_1(s+1-m) \quad (15)$$

The predicted values are stored in a buffer and the predicted values $\hat{X}_1(s)$ determined at the immediately preceding sampling instance (s−1) is supplied to the difference calculation unit.

The difference calculating unit 81 determines a set of differences of the variables in accordance with the equation $$\epsilon_i = X_{1i}(s) - \hat{X}_{1i}(s)$$

where i represents the item number of the variable. In the example, i=1-6, and the item numbers respectively denote or correspond to the variables as follows:

| i | variable, or its difference |
|---|---|
| 1 | FR |
| 2 | SP |
| 3 | GD |
| 4 | MST |
| 5 | MSP |
| 6 | RHT |

The whiteness index calculating unit 83 receives and stores the new set of differences $\epsilon_i(s)$. The differences are stored until the N-th sampling instance as counted from the time when the particular set of differences are initially stored. Thus six time series of differences of the six variables over N sampling instances are always (except at the start of the plant) stored. The number N is chosen to be a sufficient number from a statistical viewpoint, and may be 1000.

The whiteness index calculating unit 82 calculates, in accordance with the equations (11), all of the whiteness indexes representing the auto-correlation functions $AL_{11}$, $AL_{22}$, $AL_{33}$, $AL_{44}$, $AL_{55}$ and $AL_{66}$ and those whiteness indexes representing cross-correlation functions representing the effect of the manipulated variables on the state variables, namely $AL_{14}$, $AL_{15}$, $AL_{16}$, $AL_{24}$, $AL_{25}$, $AL_{26}$, $AL_{34}$, $AL_{35}$ and $AL_{36}$.

The abnormality detecting unit 83 receives the whiteness indexes of the auto-correlation functions $AL_{ii}$, namely $AL_{11}$, $AL_{22}$, $AL_{33}$, $AL_{44}$, $AL_{55}$ and $AL_{66}$ and compares each of the auto-correlations with the alarm level ALARML. If any of the auto-correlation functions is found to exceed the alarm level ALARML, the abnormality detecting unit 83 judges that the corresponding variable is abnormal. Assume that $AL_{33}$ and $AL_{66}$ are found to exceed the alarm level, then it is judged that the gas damper position command value GD and the reheater steam temperature RHT are abnormal. The abnormality detecting unit 83 therefore causes the alarm device to display alarm message as follows:

10:08:00 GD ABNORMAL -P.DIAG-
10:08:00 RHT ABNORMAL -P.DIAG-

The abnormality detecting unit 83 also notifies the fault detecting unit 84 of the variables, by their item numbers, having been found abnormal, i.e., i=3 and i=6.

The fault detecting unit 84 receives, from the abnormality detecting unit 83, the item numbers (i=3, and i=6) of the variables having been found abnormal and compares, with the alarm level, that or those cross-correlation functions representing effect of the manipulated variable having been found abnormal or the state variable having having been found abnormal. In the above example, $AL_{36}$ is compared with the alarm level. If $AL_{36}$ is found to exceed the alarm level, then it is judged that the abnormality in the gas damper position command value GD has caused the abnormality in the reheater steam temperature RHT and a fault has occurred in the gas damper position command value GD.

The fault detecting unit 84 therefore causes the alarm device 87 to display an alarm message as follows:

10:08:00 RHT ABNORMAL. PLEASE CHECK GD
-P.DIAG-

The fault detecting unit 84 also causes, upon detection of a fault, the DDC system 3 to be excluded from control and the power plant 1 to be controlled solely by the APC system 2.

When an abnormality is detected, the whiteness indexes $AL_{ij}$ stored in the memory device 85 are outputted by the output device 86, which may comprise a line printer. An example of the output is shown in FIG. 13. In the major part of FIG. 13, the column under "TIME" is for indication of time by HH:MM:SS (hour:-minute:second). It will be seen that the interval of sampling and hence calculation of the correlation functions is 40 seconds in the illustrated sample. The columns under FR, SP and GD are the areas for record of the auto-correlation functions and cross-correlation functions concerning FR, SP and GD. The columns under MST, MSP and RHT are the areas for record of the auto-correlation functions concerning MST, MSP and RHT.

The mark ":" in each of the columns under FR, SP, GD, MST, MSP and RHT denotes (the position of) the value 0, "." denotes (the position of) the alarm level ALARML. "*" denotes the value of an auto-correlation function, "A" denotes the value of a cross-correlation function representing the effect of the respective manipulated variable on MST, "B" denotes the value of a cross-correlation function representing the effect of the respective manipulated variable on MSP, and "C" denotes the value of a cross-correlation function representing the effect of the respective manipulated variable on RHT. If the mark "*", "A", "B", or "C" is within the range between ":" (value 0) and "." (alarm level ALARML), it is judged that the corresponding correlation function does not indicate abnormality. If the mark "*", "A", "B" or "C" is to the right of the mark ".", it is judged that the corresponding correlation function exceeds the alarm level ALARML and indicates abnormality. In the illustrated example, the auto-correlation function of GD becomes excessive at 10:06:40, and the auto-correlation function of RHT becomes excessive at 10:08:00 and the cross-correlation function representing the effect of GD on RHT becomes excessive at 10:08:00. Therefore, at 10:08:00, GD is recognized as being faulty and a command to exclude the DDC system from control is issued.

In the illustrated example, the alarm level ALARML is set to have the same value for all the correlation functions. But the different correlation functions may have different values for the alarm level. For instance in seeking the appropriate value for the alarm level, not only a white noise but also a stepwise signal or a ramp signal is added to the manipulated variable having the largest effect on the diagnosed object (FR in the example described), and the variations of the whiteness indexes then derived based on the predicted values from the plant diagnostic AR model 7 are tested to determine the values of the alarm level ALARML for each of the variables.

Moreover, the alarm level ALARML may not necessarily be a fixed value but may be varied depending, for example, on the condition of the plant. For example, when a disturbance is introduced and such introduction of the disturbance is known or detected (e.g., when the load is substantially and abruptly changed), the alarm level may be raised until the effect of the disturbance ceases. This measure will reduce the probability of erroneous judgement (false alarm).

It is also possible to provide one or more prealarm levels below the alarm level, to produce a prealarm when the correlation function is approaching the alarm level. For instance, pre-alarm levels may be provided at values corresponding to the levels of significance of 10%, 15% and 20% (with the alarm level corresponding to 5%), and the variation of the correlation function (in comparison with the pre-alarm levels) may be made known to the operator or a pre-alarm may be produced when it is likely that the alarm level is reached in a short time, to call the attention of the operator. By such arrangement, abnormality of the plant is detected at an earlier stage.

In the above description, it has been assumed that the APC system is of an analog type. But the APC system may alternatively be of a digital type, such as one comprising a microcomputer, adapted to perform PID control using feedback signals.

As has been described, according to the invention, a thermal power plant provided with an APC system and a DDC system in cooperation with the APC system to conduct optimum control can be diagnosed on on-line basis i.e., in real time. And the determination of the alarm level is made by a statistical technique, so that objective or consistent diagnosis, not relying on personal experience of a human operator, can be accomplished.

Moreover, not only can abnormalities in the state variables FB be detected but also faults, i.e., abnormalities in the manipulated variables MV causing the abnormality in the state variable FB can be detected. When a fault is detected, an alarm message indicating the fault, i.e., the cause of the abnormality in the state variable is produced. As a result the operator can take a measure against the fault promptly. In addition, upon detection of a fault, the DDC system can be excluded from control to leave the plant under control solely of the APC system.

What is claimed is:

1. A method for diagnosing a thermal power plant system including a thermal power plant, provided with an automatic power plant control system receiving feedback signals of state variables of the plant and performing PID control, a control model formed of a mathematical model representing the combination of the plant and the automatic power plant control system, and a direct digital control system utilizing the control model and controlling the plant to conduct an optimum control, the automatic power plant control system and the direct digital control system conducting control complementarily, said method comprising the steps of:

providing a plant diagnostic model formed of a mathematical model representing the combination of the plant, the automatic power plant control system, the control model and the direct digital control system, determining predicted values of the plant variables, by means of the plant diagnostic model, determining a difference between the predicted value of each of the plant variables and the actual value of the same plant variable, storing the determined difference successively thereby to provide a time series of the differences which have been successively determined, determining whiteness indexes used for testing the whiteness level of the time series of the differences in accordance with the time series of the differences, judging whether or not any of the plant variables is abnormal in accordance with the whiteness indexes, judging whether or not any of the manipulated variables is faulty in accordance with the whiteness indexes and the result of judgement as to abnormality, and outputting an alarm when an abnormality or a fault is detected.

2. A method according to claim 1 wherein
said step of determining whiteness indexes comprises determining a whiteness index in the form of an auto-correlation function of each time series of differences, and
said step of judging as to an abnormality comprises judging whether or not each plant variable is abnormal in accordance with the auto-correlation function of each time series of the differences of the same plant variable.

3. A method according to claim 2, wherein
said step of determining whiteness indexes comprises determining a whiteness index in the form of a cross-correlation function representing the effect of a time series of differences of a manipulated variable having been found abnormal, or a time series of differences of a state variable having been found abnormal, and
said step of judging as to a fault comprises judging whether or not the manipulated variable having been found abnormal is faulty in accordance with the auto-correlation function.

4. A method according to claim 1, wherein the judgement as to an abnormality and judgement as to a fault is made depending on whether or not the whiteness index exceeds an alarm level, the alarm level being determined by a statistical technique in accordance with a selected level of significance representing the probability of false alarm.

5. A method according to claim 1, wherein the plant variables are sampled at a regular sampling interval, and the determination of the predicted values, the determination of the differences, the determination of the whiteness indexes, the judgement as to an abnormality and the judgement as to a fault are conducted every sampling instance.

6. A method according to claim 5, wherein said step of determining the predicted values comprises determining, from the actual values of the plant variables obtained at a certain sampling instance, the predicted values for the next sampling instance.

7. A method according to claim 1, further comprising the steps of:
storing successions of the whiteness indexes which have been successively determined, from those determined most recently up to those determined a fixed number of determining operations before, the successions being updated each time a set of whiteness indexes are newly determined, and
outputting the succession of the whiteness indexes to show the trend thereof.

8. A method according to claim 1, further comprising the steps of:
causing, upon detection of a fault, the direct digital control system to be excluded from control of the thermal power plant thereby to leave the thermal power plant under the control by the automatic power plant control system alone, and
producing an indication for notifying the operator of the exclusion of the direct digital control system.

9. A system for diagnosing a thermal power plant system including a thermal power plant, provided with an automatic power plant control system receiving feedback signals of state variables of the plant and performing PID control, a control model formed of a mathematical model representing the combination of the plant and the automatic power plant control system, and a direct digital control system utilizing the control model and controlling the plant to conduct an optimum control, the automatic power plant control system and the direct digital control system conducting control complementarily, the diagnosing system comprising:
a plant diagnostic model formed of a mathematical model representing the combination of the plant, the automatic power plant control system, the control model and the direct digital control system, the diagnostic model being used to determine predicted values of the plant variables,
difference determining means determining a difference between the predicted value of each of the plant variables and the actual value of the same plant variable,
whiteness index calculating means storing the determined difference successively thereby to prepare a time series of the differences which have been successively determined, and determining whiteness indexes used for testing the whiteness level of the time series of the differences in accordance with the time series of the differences,
abnormality detecting means judging whether or not any of the plant variables is abnormal in accordance with the whiteness indexes,
fault detecting means judging whether or not any of the manipulated variables is faulty in accordance with the whiteness indexes and the result of judgement as to abnormality, and
an alarm device outputting an alarm when an abnormality or a fault is detected.

10. A system according to claim 9, wherein
said whiteness index calculating means is adapted to determine a whiteness index in the form of an auto-correlation function of each time series of differences, and
said abnormality detecting means is adapted to judge whether or not each plant variable is abnormal in accordance with the auto-correlation function of each time series of the differences of the same plant variable.

11. A system according to claim 10, wherein
said whiteness index calculating means is adapted to further determine a whiteness index in the form of a cross-correlation function representing the effect of a time series of differences of a manipulated variable having been found abnormal, or a time series of differences of a state variable having been found abnormal, and
said fault detecting means is adapted to judge whether or not the manipulated variable having been found abnormal is faulty in accordance with the auto-correlation function.

12. A system according to claim 9, wherein said abnormality detecting means and said fault detecting means make the respective judgement depending on whether or not the whiteness index exceeds an alarm level, the alarm level being determined by a statistical technique in accordance with a selected level of significance representing the probability of false alarm.

13. A system according to claim 9, wherein the plant variables are sampled at a regular sampling interval, and the determination of the predicted values, the determination of the differences, the determination of the whiteness indexes, the judgement as to an abnormality and the judgement as to a fault are conducted every sampling instance.

14. A system according to claim 13, wherein the predicted values for a certain sampling instance are determined from the actual values of the plant variables obtained at the immediately preceding sampling instance.

15. A system according to claim 9, further comprising:
a memory device storing successions of the whiteness indexes which have been successively determined, from those determined most recently up to those determined a fixed number of determining operations before, the successions being updated each time a set of whiteness indexes are newly determined, and an output device outputting the succession of the whiteness indexes to show the trend thereof.

16. A system according to claim 9, wherein said fault detecting means is adapted to cause, upon detection of a fault, the direct digital control system to be excluded from control of the thermal power plant thereby to leave the thermal power plant under the control by the automatic power plant control system alone, and to cause said alarm device to produce an indication for notifying the operator of the exclusion of the direct digital control system.

* * * * *